(12) United States Patent
Fontanella et al.

(10) Patent No.: US 9,835,420 B2
(45) Date of Patent: Dec. 5, 2017

(54) OPTRONIC DEVICE

(71) Applicant: THALES, Neuilly sur Seine (FR)

(72) Inventors: Jean-Claude Fontanella, Elancourt (FR); Pascal Rousseau, Elancourt (FR)

(73) Assignee: THALES, Courbevoie (FR)

( * ) Notice: Subject to any disclaimer, the term of this patent is extended or adjusted under 35 U.S.C. 154(b) by 65 days.

(21) Appl. No.: 14/651,189

(22) PCT Filed: Dec. 10, 2013

(86) PCT No.: PCT/EP2013/076027
§ 371 (c)(1),
(2) Date: Jun. 10, 2015

(87) PCT Pub. No.: WO2014/090772
PCT Pub. Date: Jun. 19, 2014

(65) Prior Publication Data
US 2016/0377390 A1  Dec. 29, 2016

(30) Foreign Application Priority Data
Dec. 10, 2012  (FR) ..................... 12 03347

(51) Int. Cl.
G01S 7/495 (2006.01)
F41H 13/00 (2006.01)
F41G 7/22 (2006.01)

(52) U.S. Cl.
CPC ......... F41H 13/0056 (2013.01); F41G 7/224 (2013.01); G01S 7/495 (2013.01)

(58) Field of Classification Search
CPC ............................ F41H 13/0056; F41G 7/224
See application file for complete search history.

(56) References Cited

U.S. PATENT DOCUMENTS

| 3,922,618 A * | 11/1975 | Javan ...................... H01S 3/107 359/345 |
| 7,374,106 B1 * | 5/2008 | Bromer .............. G06K 19/0723 235/451 |
| 8,066,218 B2 * | 11/2011 | Rubin ...................... B64D 7/00 244/1 TD |
| 2007/0075237 A1 * | 4/2007 | Mills ...................... F41G 7/224 250/239 |
| 2010/0119239 A1 * | 5/2010 | Wang ............... H04B 10/50575 398/198 |

FOREIGN PATENT DOCUMENTS

| DE | 102010051097 A1 | 5/2012 |
| DE | 102011015779 A1 | 10/2012 |
| WO | 02/33342 A1 | 4/2002 |
| WO | 2004/024559 A2 | 3/2004 |
| WO | 2004/109323 A2 | 12/2004 |
| WO | 2012/052914 A2 | 4/2012 |
| WO | 2014/090772 A1 | 6/2014 |

* cited by examiner

Primary Examiner — Stephen Johnson
(74) Attorney, Agent, or Firm — Thompson Coburn LLP

(57) ABSTRACT

The invention relates to an optronic device (16) capable of emitting a plurality of wavelengths comprising: an observation camera (24), and a laser unit (26) for each wavelength of the plurality of wavelengths, wherein each laser unit (26) comprises a laser source (36) capable of emitting a laser beam at the wavelength and an optical system (38) having a maximal transmission coefficient for the wavelength.

12 Claims, 3 Drawing Sheets

OPTRONIC DEVICE

CROSS-REFERENCE TO RELATED APPLICATION

This application is a U.S. National Phase application of PCT/EP2013/076027, filed on Dec. 10, 2013, which claims the benefit of French Application No. 12 03347, filed Dec. 10, 2012, both of which are incorporated herein by reference in their entireties.

FIELD OF THE INVENTION

The invention relates to an optronic device. The invention also relates to a platform that includes the said optronic device and a protection method for protecting the abovementioned platform.

BACKGROUND OF THE INVENTION

A platform of interest is adapted to support humans, weapons, sensors, or other types of equipment. Military transport aircraft, civil aircraft, helicopters, armoured vehicles, a military facility or a civilian building are examples of platforms of interest.

In certain cases, the platform of interest is confronted with threats that benefit from an optical or optronic guidance system. For example, missiles are guided by optronic components.

In addition, the equipment units that guide these menacing objects use an ever increasing number of spectral bands. For example, the bands that are used include the visible-, near infrared-, or thermal bands. The radiation belongs to the visible band if its wavelength is comprised between 400 nanometers (nm) and 800 nm, to the near infrared band if its wavelength is comprised between 800 nm and 2.3 microns (μm), and to the thermal band if its wavelength is comprised between 3 μm and 5 μm or between 8 μm and 12 μm.

It is therefore desirable to protect the various different platforms from all types of menacing objects making use of an optronic guidance system.

In order to do this, it is a known practice to use appropriate means of detection and of counter measures that are adapted to deal with a large number of threats. Thus, various systems have been proposed such as optronic counter measure devices having lasers which, in particular, enable interference in all of the abovementioned bands.

The lasers employed are, for example, solid lasers associated with parametric oscillators, use of these parametric oscillators enabling the provision of strong peak power.

Such lasers have proven to be cumbersome, which poses problems when it comes to integrating them in the platforms considered.

In order to solve this problem, the laser sources are moved off relatively far away from the imaging and beam pointing systems of the platform. This distancing imposes the use of transport optics in addition to the collimating optics in order to bring the laser beams from the outlet of the laser sources up to the imaging and pointing systems.

The multiplicity of wavelengths of the laser sources requires for the transport and collimation optics to be capable of transmitting multiple different wavelengths with a low absorption level. The processing of the required optics then proves to be difficult to carry out technically apart from being expensive.

There is therefore a need for an optronic device whereof the production and operational implementation are simpler than for known devices offered by the state of the art.

SUMMARY OF THE INVENTION

According to the invention, this objective is achieved by an optronic device that is capable of emitting a plurality of wavelengths. The device comprises an observation camera. The device comprises, for each wavelength of the plurality of wavelengths, a laser unit comprising of a laser source and an optical system. The laser source is capable of emitting a laser beam at the wavelength of the laser unit. The optical system has a maximal transmission coefficient for the wavelength of the laser unit.

According to particular embodiments, the optronic device includes one or more of the following characteristic features, taken into consideration in isolation or in accordance with any technically possible combination(s):

- the device comprises a support provided with a face that includes at least two openings.
- the face is situated in front of the laser source and the observation camera in such a manner that the laser beams emitted by the laser sources pass through at least one opening and the light rays coming from the field of view of the camera pass through an opening of the face that is different from the opening or openings through which the laser beams emitted by the laser sources pass.
- the face includes one central opening and multiple peripheral openings.
- the peripheral openings are arranged in a ring.
- the peripheral openings are arranged in rows.
- the light rays coming from the field of view of the camera pass through the central opening and each laser beam emitted by the laser sources passes through a peripheral opening.
- each laser source is a laser diode.
- each laser source is a quantum cascade laser diode.
- the optical system of each laser unit includes a beam deflection system.
- the camera is provided with an optic.
- the optics of the camera and the optical systems are arranged to be projecting out in relation to the face by at most ten centimeters.
- the optronic device is a counter measures device.
- the optronic device is an "active multispectral imaging" observation device.

The invention also relates to a platform comprising an optronic device as previously described above.

According to particular embodiments, the platform includes one or more of the following characteristic features, taken into consideration in isolation or in accordance with any technically possible combination(s):

- the platform comprises a body;
- the device is movable relative to the body of the platform in rotational motion along two perpendicular axes;
- the device is integrated into the body of the platform.

The invention also relates to a protection method for protecting a platform as previously described, the method including a detection step of detecting at least one threat to the platform by means of the optronic device. The method further also includes a step of selection of an action to be taken to counter the threat or threats and a neutralisation step of neutralising the threat or threats by means of one or more laser beams from the laser units of the optronic device.

According to particular embodiments, the method includes one or more of the following characteristic features, taken into consideration in isolation or in accordance with any technically possible combination(s):

The method includes in addition, a position determination step of determining the position of the threat or threats.

The method includes in addition, a beam centering step of centering one or more laser beams from the laser units on the threat or threats.

BRIEF DESCRIPTION OF THE DRAWINGS

Other characteristic features and advantages of the invention will become apparent upon reading the description of the embodiments of the invention that follow, given solely by way of example and with reference being made to the following drawings wherein.

DETAILED DESCRIPTION OF THE INVENTION

In the following sections, three axes X, Y and Z that perpendicular to each other are defined.

Figure 1:
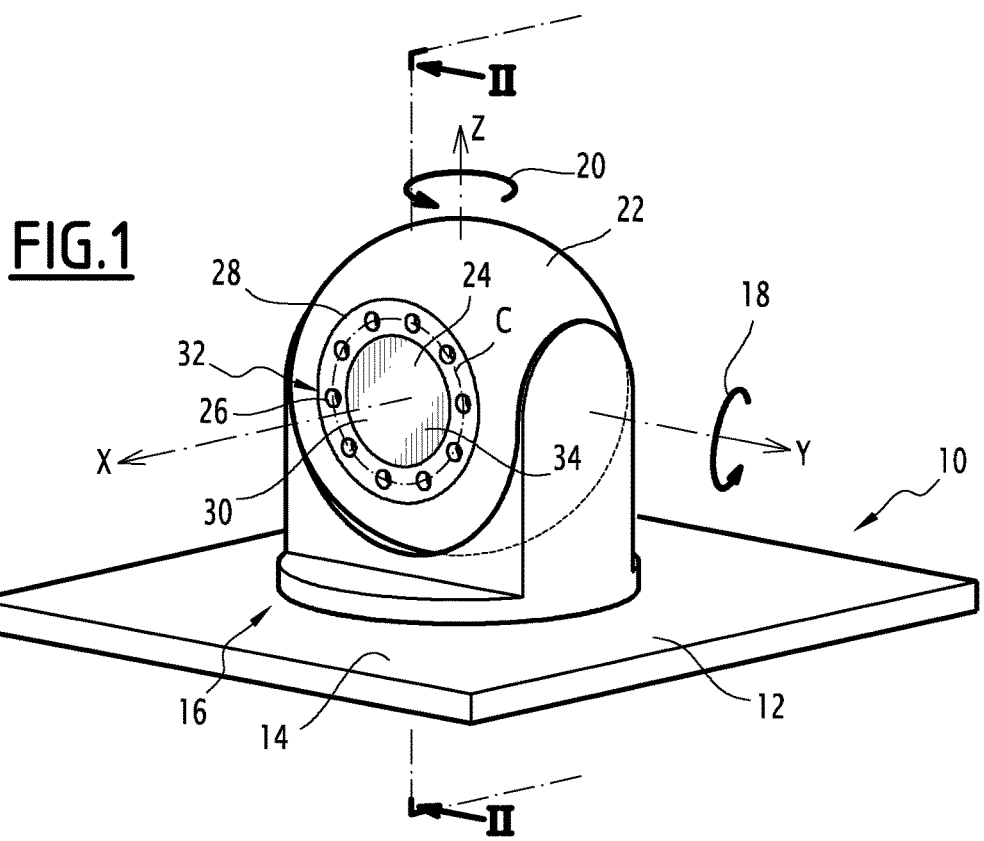
FIG. 1, is a diagrammatic view of a part of a platform provided with an optronic counter measures device according to a first embodiment of the invention.
Figure 2:
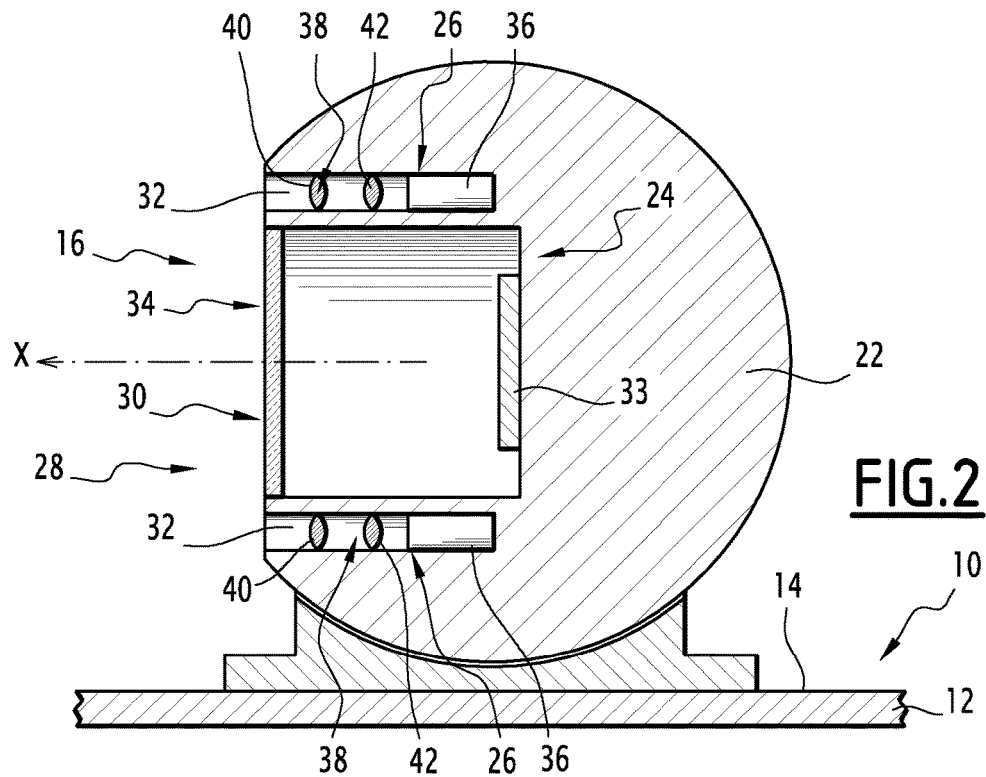
FIG. 2, is a diagrammatic view of a cross section of the part of the platform shown in FIG. 1 along the axis II-II.

Only one part of the platform 10 is represented in FIG. 1.

The platform 10 comprises a body 12.

The body 12 has an exterior surface 14 that is substantially planar.

The platform 10 also includes an optronic counter measures device 16 that is capable of emitting a plurality of wavelengths. In the context of this invention, a wavelength is the centre of the emission of a spectral band. A spectral band is typically a band having a width of 300 nanometers.

The device 16 is connected to the body 12. The device 16 is movable relative to the body 12 of the platform 10 so as to be rotatable along the axes Y and Z. The arrows 18, 20 symbolise these possibilities of movement.

For a platform, the axis Y is then referred to as site and the axis Z is referred to as azimuth.

In practice, the mobility of the device 16 is obtained by making use of two motorised axles, each motorised axle being capable of causing the device 16 to rotate around one of the two directions Y and Z.

In the example shown in FIG. 1, the device 16 comprises a support 22, an observation camera 24 and a plurality of laser units 26.

The support 22 is a housing unit referred to as a "ball" with a generally spherical shaped form having a face 28 with a plurality of openings 30, 32.

According to one variant, the support 22 has a differently shaped form, for example a rectangular parallelepiped form.

The face 28 is the normal to the axis X.

In the subsequent sections, the terms "in front" and "behind" are defined in a manner such that the support 22 is behind the face 28.

The face 28 includes one central opening 30 and ten peripheral openings 32.

According to one variant, the number of peripheral openings 32 is other than ten.

The central opening 30 and the peripheral openings 32 are circular openings.

Other forms for the central openings 30 and peripheral openings 32 may possibly be envisaged, such as rectangular or elliptical shaped forms.

The central opening 30 has a diameter that is larger than that of the peripheral openings 32.

According to the example shown in FIG. 1, the diameters of the peripheral openings 32 are identical.

By way of a variant, each peripheral opening 32 is associated with a wavelength. The diameters of the peripheral openings 32 may be different depending on the wavelength and the divergence desired for the associated beam.

In addition, the peripheral openings 32 are arranged in a ring around the central opening 30.

The centres of the peripheral openings 32 are on a circle whose center is the centre of the central opening 30 and whose diameter is greater than the diameter of the central opening 30.

According to one variant, the peripheral openings 32 are distributed along two parallel lines arranged on the periphery of the central opening 30.

According to yet another variant embodiment, the peripheral openings 32 and the central opening 30 are distributed on the basis of the space available on the face 28.

The camera 24 includes a detector 33 and an optic 34.

According to one variant, the camera 24 includes missile warning functions for missile launch detection (often referred to by the acronym MLD) and/or detection of the firing of gun shots (also referred to by the acronym HFI in reference to the English terminology "Hostile Fire Indicator").

According to the example shown in FIG. 1, the camera 24 is a matrix camera. The detector 33 is an array of sensors.

In the particular case of FIG. 1, the camera 24 is capable of detecting the light emitted with at least one wavelength among the plurality of wavelengths that the device 16 is capable of emitting.

By way of a variant, the camera 24 is not capable of detecting the wavelengths that the device 16 is capable of emitting.

According to the example shown in FIG. 1, the camera 24 may be multispectral, that is to say capable of detecting various different wavelengths.

Preferably, the camera 24 is capable of detecting wavelengths comprised in the visible band, in the near infrared band, or in the thermal bands.

The observation camera 24 is positioned in the support 22 behind the face 28.

The camera 24 is oriented in such a manner that the optical axis of the camera 24 is the axis X.

Each laser unit 26 is capable of emitting a laser beam at a wavelength that is different from that of the other laser units 26.

By way of a variant, a plurality of laser units 26 are associated with the same wavelength. This makes it possible to increase the optical power available for a wavelength.

For the purposes of illustration, assuming that all of the laser units 26 are capable of emitting a laser beam of the same intensity and that three laser units 26 are capable of emitting at the same wavelength, the intensity available to the wave length is then three times the intensity of one single laser unit 26.

Each laser unit 26 includes a laser source 36 and an optical system 38.

The laser source 36 is capable of emitting a laser beam having an $M^2$ factor that is less than 2.0, preferably less than 1.2.

The $M^2$ factor, also known as beam quality factor or beam propagation factor, is a common measure of the beam quality of a laser beam. According to ISO Standard 11146, it is defined as the product of the waist (Gaussian neck) of the beam by the half beam divergence measured in the far field divided by $\lambda/\pi$, where $\lambda$ is the wavelength. This parameter corresponds to the beam parameter product obtained when considering a diffraction—limited Gaussian laser beam with the same wavelength. In other words, it may be written that the half angle divergence of the light beam is given by the following mathematical expression:

$$\theta = M^2 \lambda / (\pi \cdot \omega_0),$$

where:
- $\theta$ is the angular half divergence of the light beam;
- $\omega_0$ is the beam radius at the beam waist; and
- $\lambda$ is the wavelength of the laser beam.

According to the ISO Standard 11146, the $M^2$ factor can be calculated from the measured evolution of the beam radius along the propagation direction (i.e. this evolution is also known as caustic). Alternative methods that are based on measurements with wave front sensors, for example by Shack-Hartmann sensors, also exist but have not been considered in the context of this invention, the $M^2$ factor being defined in accordance with the standard 11146.

The beam emitted from the laser source 36 is almost diffraction limited and has a limited angle divergence relative to a beam having a large $M^2$ factor.

By way of example, the laser source 36 is a quantum cascade laser diode. Such a diode is also known by the acronym QCL Quantum Cascade Laser.

A quantum cascade laser diode is unipolar. The laser emission is obtained by creation of intersubband transitions in a plurality of hetero structures forming quantum wells.

A quantum cascade laser diode has a good efficiency (ratio of laser energy delivered and the electrical energy of the laser diode power supply), in particular in the bands 3 μm to 5 μm and 8 μm to 12 μm. For example, the quantum cascade laser diode is suitable for emitting a beam having an intensity greater than 1 optical watt.

According to one variant, the laser source 36 includes an assembly of quantum cascade laser diodes. In this case, the laser source 36 is capable of emitting a beam having an intensity of several optical watts.

The optical system 38 includes one or more optics 40, 42.

For example, the optical system 38 comprises two lenses 40, 42 that ensure the collimation of the laser beam at a desired divergence.

Each optic (lens) 40, 42 of the optical system 38 presents a maximal transmission coefficient for the emission wavelength of the laser source 36.

The term "maximal", is understood to convey that the transmission curve of the optic 40, 42 as a function of the wavelength has at least one relative maximum at the level of the wavelength. Preferably, if it is technically possible, the relative maximum is an absolute maximum.

For example, according to the example shown in FIG. 1, each surface of the optics 40, 42 of the optical system 38 is coated with a treatment optimised for the single emission wavelength of the laser source 36.

The laser units 26 are situated along the axis X and are parallel with the optical axis of the camera 24.

This means in particular that the optical axes of each optic 40, 42 of the optical systems 38 are along a direction parallel to the axis X.

The laser units 26 are all in the proximity of the camera 24.

In the proposed embodiment, the laser units 26 are at a distance of a maximum of fifteen centimeters from the centre of the central opening 30.

According to one variant, one or more of the laser units 26 are offset lasers.

An offset laser is situated at a distance greater than fifteen centimeters from the face 28. In this case, the laser beam emitted from the laser is transported at the level of the face 28 by an optical assembly or by an optical fibre.

In addition, the laser units 26 are arranged in relation to the peripheral openings 32 in a manner such that the laser beams emitted by the laser units 26 pass through one of the peripheral openings 32.

More precisely, in the case of FIG. 1, each peripheral opening 32 corresponds to one single laser unit 26.

In the case of FIG. 1, the optical axes of each optic 40, 42 of the optical systems 38 pass through the centre of a peripheral opening 26.

In addition, in the case of FIG. 1, the laser units 26 and the camera 24 are entirely located in the support 22. As a result thereof, the laser units 26 and the camera 24 are situated behind the face 28.

The operation of optronic counter measures device 16 will now be described with reference to the FIG. 3 which is a flow chart of the implementation of a protection method for protecting the platform 10.

The protection method includes a step 50 of detection of at least one potential threat with the likelihood and capability to target the platform 10.

A threat is, for example, a firing control system. Such a firing control system is, for example, part of an enemy platform.

The step 50 of detection is operationally implemented by making use of the camera 24. In order to enable the detection, during the detection step, the device 16 is set in rotational movement along the two axes Y and Z in a manner so as to cover a field of view greater than the camera's field of view 24.

By way of a variant, the detection step 50 is operationally implemented by cooperation with other detection systems, such as a radar.

The image acquired by the camera 24 is displayed by a display device to an operator. The latter is then able to determine whether a firing control system is present in the displayed image or not.

By way of a variant, the determination of the presence of a firing control system is carried out in an automated manner by making use of a recognition software application.

The method then includes an analysis step 52 for analysing the threat detected in the step 50 of detection.

In the case of a firing control system, the analysis consists, for example, of determining the type of firing control system, whether the firing control system is ready to fire, and whether the firing control system is positioned in a manner such as to target the platform 10.

This analysis step 52 is carried out by the operator by studying the images displayed by the display device.

According to one variant, the step 52 of analysis is also implemented in an automated manner.

Based on the results of the analysis, an action to be carried out is selected during the step 54 of selection of the method. The term 'action' is to be understood in a broad sense, as encompassing "active" actions like determining more precisely the position of the threat, neutralising the threat in order to render it inoperative and "passive" actions such as waiting, ignoring the threat.

For the remainder of the description, it is assumed that the threat is considered to be sufficiently dangerous so as to require neutralisation. In such a case, it is necessary to determine in advance, the position of the threat with a great degree of precision in order to point the laser unit 26.

Figure 3:
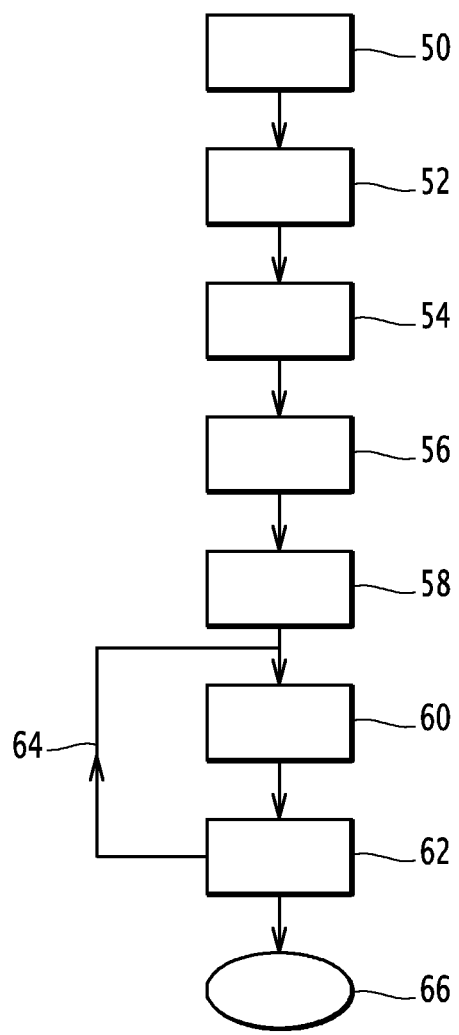
FIG. 3, is a flow chart of an exemplary form of implementation of a method for protecting a platform that includes an optronic counter measures device according to the invention.

In the case of the example shown in FIG. 3, the method comprises a step 56 of detecting the position of the threat.

The position is often determined by acquiring the knowledge about two angles that determine one direction.

By way of a variant, the position of the threat is determined by means of three coordinates.

For example, in this step 56 of detecting the position, an accurate detection process is carried out. A zone of interest within which the threat is located is analysed with greater precision by scanning the zone of interest with a light beam. The scanning is carried out by rotation of the device 16.

According to this example, the step 56 of precise detection of the position is performed by searching for the cat's eye effect, that is to say, by seeking to obtain a self-collimation of a laser beam emitted by a laser source 36 with one of the component parts of the optic unit of the threat device. This also makes it possible to confirm the hostile nature of the threat since it is thus confirmed that the threat is indeed targetting the platform 10.

In the event where the enemy threat is moving, the position to be determined is an estimate of the actual current position based on the previous movements of the target.

At the end of the step 56 of detection of the position of the threat, the position of the threat is known with enough precision so as to be able to initiate the neutralisation process.

It also necessary to determine the nature of the neutralisation (decoying, jamming, blindness or glare) to be performed on the threat during a determination step 58 of determining the nature of the neutralisation to be carried out. For example, the characteristics of the laser emission to be sent on to the threat are determined. The wavelength or wavelengths of the laser emission, the desired intensity or intensities and duration of the radiation are examples of the characteristics to be determined.

The method includes a neutralisation step 60 of neutralising the threat. The neutralisation is carried out in two stages: the device 16 is oriented towards the position determined by means of one rotation or multiple rotations of the device 16 in a manner so as to focus one laser unit 26 on the threat and then the laser unit 26 is controlled and commanded so as to emit an optical beam. The control command of the laser unit 26 is typically an electric current command.

In the event where several laser units 26 are involved in the step 60 of neutralisation, instead of considering one laser unit 26, a fictitious laser unit is then considered whose position corresponds to the barycentre of the position of the laser units 26 involved in the neutralisation step 60.

The neutralisation step 60 is then implemented by orienting the device 16 in a manner so as to focus the fictitious laser unit on the threat and then by commanding the various different laser units 26 involved in the neutralisation step 60 to emit a laser beam.

According to a variant, the step 60 of neutralisation is repeated several times. This makes it possible to ensure that at least one laser beam reaches the threat when the threat is in movement.

The method includes, also, a step 62 of studying the impact on the threat of the neutralisation process implemented in the step 60 of neutralisation of the threat.

This involves verifying whether or not the threat has been effectively neutralised by the laser beam that has just been sent to it.

If necessary, when it is determined at this step that the glare produced is non-existent or insufficient or simply in the event of doubt, the method proceeds to implement a new step 60 of neutralisation. This is symbolised by the arrow 64.

The neutralisation step 60 is thus repeated until the neutralisation produced is sufficient, which corresponds to the result 66 of the flowchart represented in FIG. 3.

The proposed device 16 thus provides the ability to effectively protect the platform 10 against an external threat.

In addition, as the optical system 38 has a maximal transmission coefficient for a single wavelength, its manufacture is facilitated and made less expensive in comparison to the state of the art. The result thereof is the facilitated production of the device 16.

This effect is even more marked when the laser sources 36 are laser diodes because laser diodes have the advantage of being low weight and low cost. Moreover, laser diodes have a high performance efficiency.

The arrangement in close proximity of the camera 24 and the laser sources 36, in addition, makes it possible to avoid the use of transport optics, thereby reducing the dimensions of the device 16.

In addition, the device 16 has greater compactness, in particular when all of the laser units 26 are arranged in proximity to the face 28.

In this case, the mass and inertia of the device 16 to be oriented are low which allows for the rapid orientation thereof. This results in a decrease in the difficulty with regard to satisfying the constraints on the orientation of the laser units 26 in terms of quality of pointing and tracking capability.

Figure 4:
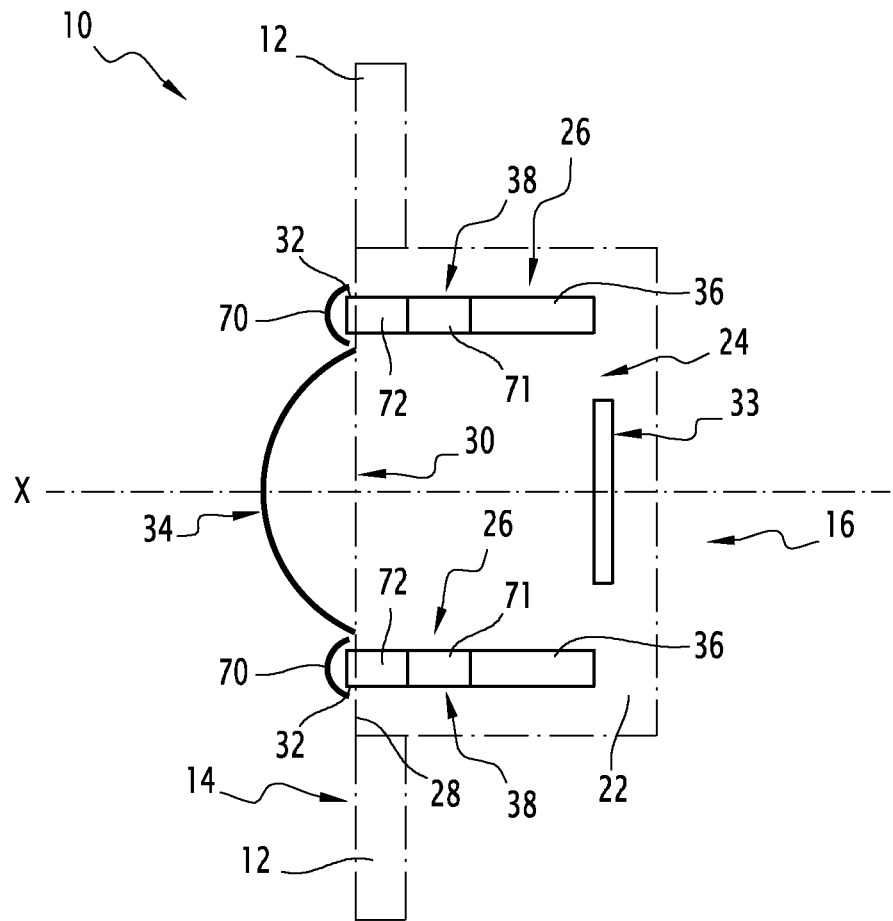
FIG. 4, is a diagrammatic view of a cross section of an example of an optronic counter measures device according to a second embodiment of the invention.

A second embodiment is proposed for the device 16 in FIG. 4. The elements that are identical to the first embodiment have not been repeated in the following sections, with only the differences being clearly highlighted.

In this embodiment, the device 16 is integrated into the body 12 of the platform 10.

In addition, the device 16 is fixed relative to the body 12.

In the embodiment shown in FIG. 4, a part of the camera 24 and a part of the laser unit 26 are in front of the face 28.

In the example shown in FIG. 4, the optic 34 is an optic (lens) that provides the camera 24 with a very significant field of observation, for example corresponding to a viewing angle in each direction greater than 90°, preferably greater than 120°.

The optic lens 34 of the camera 24 is in front of the face 28. The optic lens 34 forms a projection whose maximal extension along the axis X is less than ten centimeters from the face 28. Preferably, the optic 34 forms a projection whose maximal extension along the axis X is less than five centimeters.

Each optical system 38 includes a window 70 placed in front of the face 28 that is capable of protecting the other elements of the laser unit 26.

In similar fashion as for the optic 34 of the camera 24, each window 70 forms a projection whose extension along the optical axis of the optical system 38 to which the window 70 belongs is less than ten centimeters from the face 28. Preferably, each projection has an extension of less than five centimeters.

According to the example shown, the extension of the projection formed is the same for each window 70.

In the case of FIG. 4, each window 70 forms a projection whose extension along the optical axis of the optical system 38 to which the window 70 belongs is strictly less than that of the projection of the optic 34. In particular, the extension of the projection of each collimation optics 70 is equal to ⅕ of the extension of the projection of the optic lens 34.

In addition, each optical system 38 comprises a collimation optic 71 and a beam deflection system 72. According to a preferred variant embodiment, the beam deflection system 72 is placed between the window 70 and the collimation optic 71.

The beam deflection system 72 is capable of controlling the orientation of the beam emitted by the laser source 36, independently of the axis of the camera 24 and the beams of the other laser sources 36.

Preferably, the beam deflection system 72 is capable of directing the beam emitted by the laser source 36 in the entire field of view of the camera 24.

By way of example, the beam deflection system 72 is a double Dove prism.

A double Dove prism comprises two isosceles 90° roof prisms that are identical. These prisms have one base adhered to the other base. The double Dove prism is mounted on a mechanical device that provides the ability to cause the pivoting thereof in two perpendicular directions.

The rotation of the prisms allows for controlling the orientation of the beams emitted by the laser sources 36.

The device 16 according to the second embodiment is adapted for the operational implementation of the same method for protecting the platform 10 as the device 16 according to the first embodiment.

The device 16 allows for easier implementation of certain steps due to the fact that the beam deflection system 72 makes it possible to orient each beam emitted by each laser source 36 in an independent manner.

It being possible for the laser beams to be oriented independently of the device 16, the threat is taken into account regardless of its position in the field of the camera 14. There is no need to orient the support 22 in order to implement the protection method.

In addition, compared to the embodiment represented in FIG. 1, this device 16 according to the second embodiment presents the advantage that several threats may be addressed simultaneously. Indeed, in the step 60 of neutralisation in particular, it is possible to direct the beam emitted by one laser source 36 along one direction and to direct the beam emitted by another laser source 36 along a different direction. In order to do this, one needs simply to control/command differently the second beam deflection system 72 associated with the second laser source 36.

The device 16 according to the second embodiment therefore provides the ability to effectively protect the platform 10 against multiple simultaneous external threats.

In addition, as in the case of the first embodiment, the optical system 38 presents a maximal transmission coefficient for one single wavelength. As a result thereof, the production of the device 16 according to the example shown in FIG. 4 is also simplified as compared to the state of the art.

In addition, the device 16 presents greater compactness, in particular when all of the lasers units 26 are in close proximity to the face 28.

In addition, the projections of the optics 34, 70 present a limited extension towards the exterior. This type of integration of the device 16 in the body 12 is sometimes known as "flush integration". This makes it possible to avoid generating the formation of aerodynamic turbulence during the movement of the platform 10. In addition, it is more difficult to detect such a device 16 with a radar.

By way of a variant, the platform 10 comprises a plurality of devices 16 according to the second embodiment in a manner so as to cover a much greater field of view than with a single device 16. Typically, the platform 10 comprises three devices 16 having cameras 24 whose fields of view are at least 120°, the assembly of three devices 16 providing the ability to cover the periphery of the platform 10 that is likely to be threatened. This ensures better protection of the platform 10.

Furthermore, according to one embodiment, the device 16, with laser units 26 having increased divergence in a manner so as to cover a portion of the field of the camera 24, is a device dedicated only to observation. The device 16 is then adapted for "active multispectral imaging" since the observation camera 24 detects light emitted by the laser units 26.

The invention claimed is:

1. An optronic device for emitting a plurality of wavelengths comprising:
    an observation camera;
    a laser unit for each wavelength of the plurality of wavelengths, wherein each laser unit comprises:
        a laser source for emitting a laser beam at the wavelength of the laser unit; and
        an optical system having a maximal transmission coefficient for the wavelength; and
    a support provided with a face situated in front of the observation camera and the laser sources, wherein the face includes:
        at least one camera opening in front of the observation camera that allows for the passage of light rays coming from a field of view of the observation camera through the at least one camera opening to the observation camera; and
        laser source openings in front of the laser sources so that laser beams emitted by the laser sources pass through the laser source openings.

2. The device according to claim 1, wherein:
    the at least one camera opening is a central opening; and
    the laser source openings are peripheral openings arranged in a ring.

3. The device according to claim 1, wherein:
    the at least one camera opening is a central opening; and
    the laser source openings are peripheral openings arranged in rows.

4. The device according to claim 1, wherein each laser source is a laser diode.

5. The device according to claim 1, wherein the optical system of each laser unit includes a beam deflection system.

6. The device according to claim 1, wherein the observation camera comprises an optic lens, and wherein the optic lens and the optical system of each laser unit are arranged to be projecting out in relation to the face by at most ten centimeters.

7. The device according to claim 1, wherein the device is an optronic counter measures device.

8. The device according to claim 1, wherein the device is an active multispectral imaging observation device.

9. A platform comprising:
    at least one optronic device for emitting a plurality of wavelengths, wherein each optronic device comprises:
        an observation camera;

a laser unit for each wavelength of the plurality of wavelengths, wherein each laser unit comprises a laser source for emitting a laser beam at the wavelength of the laser unit and an optical system having a maximal transmission coefficient for the wavelength; and a body and wherein the at least one optronic device is movable relative to the body of the platform in rotational motion along two perpendicular axes.

10. The platform according to claim 9, wherein the device is integrated into the body of the platform.

11. A method for protecting a platform, wherein the platform comprises at least one optronic device for emitting a plurality of wavelengths, wherein each optronic device comprises:

an observation camera;
a laser unit for each wavelength of the plurality of wavelengths, wherein each laser unit comprises:
a laser source for emitting a laser beam at the wavelength of the laser unit;
an optical system having a maximal transmission coefficient for the wavelength; and
a support provided with a face situated in front of the observation camera and the laser sources, wherein the face includes:
at least one camera opening in front of the observation camera that allows for the passage of light rays coming from a field of view of the observation camera through the at least one camera opening to the observation camera; and
laser source openings in front of the laser sources so that laser beams emitted by the laser sources pass through the laser source openings;

the method comprising:
detecting of at least one threat to the platform by the optronic device;
selecting an action to be taken to counter the at least one threat;
neutralizing the at least one threat by means of one or more of the laser beams from the laser units of the optronic device thereby protecting the platform.

12. The method according to claim 11, wherein the method further comprises:
determining a position of the at least one threat; and
centering the one or more of the laser beams from the laser units on the at least one threat.

* * * * *